(12) United States Patent
Bravo et al.

(10) Patent No.: US 7,956,284 B2
(45) Date of Patent: Jun. 7, 2011

(54) IN-CEILING ZONE CABLING ENCLOSURE

(75) Inventors: Rey Bravo, Manhattan, IL (US); Brett A. Swett, Bolingbrook, IL (US); Mark A. Vogel, Hinsdale, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 12/871,571

(22) Filed: Aug. 30, 2010

(65) Prior Publication Data

US 2011/0000710 A1    Jan. 6, 2011

Related U.S. Application Data

(63) Continuation of application No. 12/167,672, filed on Jul. 3, 2008, now Pat. No. 7,795,533.

(51) Int. Cl.
*H01J 5/00* (2006.01)

(52) U.S. Cl. ............... 174/50; 174/63; 174/61; 174/58; 248/343; 52/39; 361/724; 312/242

(58) Field of Classification Search .............. 174/50, 174/53, 54, 60, 61, 58, 520; 52/39, 506.06; 248/343; 362/404; 361/600, 724; 211/26; 312/329

See application file for complete search history.

(56) References Cited

U.S. PATENT DOCUMENTS

| | | | |
|---|---|---|---|
| 5,435,641 A * | 7/1995 | Dumon Dupuis et al. . | 312/223.1 |
| 5,842,313 A | 12/1998 | Murray et al. | |
| 5,911,661 A | 6/1999 | Murray et al. | |
| 5,939,671 A | 8/1999 | Gretz | |
| 5,954,410 A | 9/1999 | Noellert | |
| 6,112,483 A | 9/2000 | Murray et al. | |
| 6,465,736 B1 | 10/2002 | Spadaro | |
| 6,930,250 B1 | 8/2005 | Drane | |
| 6,932,443 B1 * | 8/2005 | Kaplan et al. ............. | 312/213 |
| 7,297,870 B1 | 11/2007 | Sartini | |
| 7,477,829 B2 * | 1/2009 | Kaplan .................... | 385/147 |
| 7,510,159 B2 | 3/2009 | Rippel | |
| 7,546,019 B1 * | 6/2009 | Belcher .................... | 385/135 |
| 7,812,253 B2 * | 10/2010 | Moselle .................... | 174/50 |
| 7,816,602 B2 * | 10/2010 | Landry et al. ............. | 174/50 |

* cited by examiner

*Primary Examiner* — Dhiru R Patel
(74) *Attorney, Agent, or Firm* — Robert A. McCann; Christopher S. Clancy

(57) ABSTRACT

An in-ceiling cabling enclosure for supporting communications network equipment and cables interconnecting the network equipment including a front wall, a rear wall, and two side walls extending between the front wall and the rear wall creating a volume inside the enclosure. An access door assembly is pivotally connected to either the rear wall or the two side walls. The access door assembly pivots through an arc of ninety degrees between a first position opening the enclosure and a second position closing the enclosure. An equipment mount plate is attached to an interior portion of the access door assembly, and opposed equipment mount rails are removably attached to the equipment mount plate. The equipment mount rails are adapted to receive the network equipment and to secure the network equipment to the access door assembly. A cable slack management tray extends between the opposed equipment mount rails, and the slack management tray has a surface adapted to support and maintain the position and the contour of cable bundles located in the enclosure. A thermal management system is also disposed in the housing to provide efficient exhaust of hot air generated by active equipment in the enclosure to the space outside of the enclosure.

11 Claims, 16 Drawing Sheets

IN-CEILING ZONE CABLING ENCLOSURE

CROSS-REFERENCE TO RELATED APPLICATIONS

This application is a continuation of U.S. application Ser. No. 12/167,672, filed Jul. 3, 2008.

FIELD OF THE INVENTION

The present invention relates to an in-ceiling zone cabling enclosure utilized in routing and distributing cables in a building to user work stations and, in particular, to an in-ceiling cabling enclosure that provides a robust structural design for supporting network equipment, a thermal management system that optimizes air flow through the enclosure for maximum heat dissipation and hot air evacuation, and efficient cable routing and slack management.

BACKGROUND OF THE INVENTION

Workspaces in buildings today consist of multiple electrical and electronic communication devices, such as computers, telephones, and the like that may be integrally connected to one another, and at the same time are electrically connected, wireless or by wire, to servers, databases and other equipment located at the central place in the building. These servers, databases and the like store, generate and transmit data, voice and video signals that must be transmitted through multiple communication cables to a user's workstation. Many buildings have adopted an open office architecture, where communications cables enter the building, are routed through risers to wiring closets located on the various floors of the building, and then across the air handling space between the original ceiling and a dropped false ceiling to an in-ceiling cable distribution enclosure, and then to a user's workstation. As additional and more powerful electronic devices are incorporated into existing communications networks to provide increased data through the network in a given building, it is important that the in-ceiling cable distribution enclosure be capable of supporting additional switching, routing and connection equipment that adds weight that must be supported by the enclosure. The enclosure must also be able to control the flow of and dissipate increasing amounts of heat as higher powered active communication equipment is housed in the enclosure. The enclosure must further be capable of managing an increased number of cables that are routed through the enclosure, and of routing the cables away from the air flow path in the enclosure.

Presently available in-ceiling zone cabling enclosures are not readily adapted to support the weight of additional switching and routing equipment necessary to support a typical workstation. Nor are presently available enclosures of the type described capable of efficiently directing the flow of the air in the enclosure and dissipating heat generated by the switching and other equipment located within the enclosure. Presently available enclosures also fail to provide sufficient structural strength to enable the proper and efficient management of the multitude of cables entering, connecting, and leaving the enclosure.

Therefore, there is a need for an in-ceiling zone cabling enclosure that is sufficiently robust to support, without congestion, the amount of communication switching, routing and cable equipment necessary to satisfy today's increasing demand for the availability of Power over Ethernet (PoE) enabled ports through which voice, data and video are conveyed to a typical workstation. A need also exists for an enclosure of the type described that can accommodate high wattage networking equipment that can efficiently route and effectively dissipate heat from the enclosure, and then can deflect warm air leaving the enclosure away from cooling air entering the enclosure. A further need also exists for an enclosure that includes structure that provides room for additional cables, that allows the cables to be efficiently organized and installed pinch free, and that doesn't allow the cables in the enclosure to interfere with the thermal management air flow pattern inside the enclosure. Additionally, there is a need for an enclosure that is adapted to support active zone cabling (TIA/EIA Standard 569) or passive equipment in the enclosure without the need for adding to or modifying the configuration of the enclosure.

A need also exists for an in-ceiling enclosure that relieves telecommunication room congestion and may even replace the telecommunication room, and provides a cost effective apparatus for deploying network infrastructure that increases network flexibility, accessibility and scalability, and supports centralized or distributed network switching and Fiber To The Zone (FTTZ) network infrastructure topology.

A need also exists for an enclosure of the type described that can be conveniently located in the air handling space above a drop ceiling, resulting in the ability to move network equipment closer to the work area and the ultimate user, while allowing faster and easier moves, adds and changes.

SUMMARY OF THE INVENTION

The present invention comprises a telecommunications system enclosure adapted to be installed near user workstation, and in the air handling space between the natural ceiling and a drop ceiling in a work area. The enclosure accommodates active and passive network equipment, and the cables to, from and in the enclosure. Equipment mounting brackets and an equipment mounting plate are attached to the inside of an access door assembly that pivots between a closed and an open position. Active and passive equipment, or in other embodiments, passive equipment only, is attached to the mounting brackets and plate. A thermal management system, including air intake vents, an air dam and an air exhaust fan assembly, provides cooling air to the active equipment in the enclosure, and exhausts heated air from the enclosure in a direction away from the cooling air intake vents. A cable routing and slack management system, including a horizontal slack management tray with shear-forms for attaching cable bundles to the slack management tray, manages cable slack within the enclosure without the use of additional cable managers. The cable management system also contributes to thermal management and maintaining proper air flow through the enclosure by keeping the cables in the enclosure out of the vertical channels comprising the active equipment ventilation path. The enclosure also has a robust structural design, including reinforced pivotal mounting structures between the moveable access door assembly and the enclosure, support for additional equipment weight with gas piston dampers controlling the opening speed of the access door assembly, and a configuration enabling front accessible moves, adds and changes. The enclosure is also adapted to be readily converted from a passive to an active network equipment enclosure by inserting an exhaust fan assembly in the enclosure.

BRIEF DESCRIPTION OF THE DRAWINGS

Certain examples of the present invention are illustrated by the accompanying figures. It should be understood that the figures are not necessarily to scale and that details that are not necessary for an understanding of the invention, or that render other details difficult to perceive, may be omitted. It should be understood, of course, that the invention is not necessarily limited to the particular examples illustrated herein.

DETAILED DESCRIPTION

Figure 1:
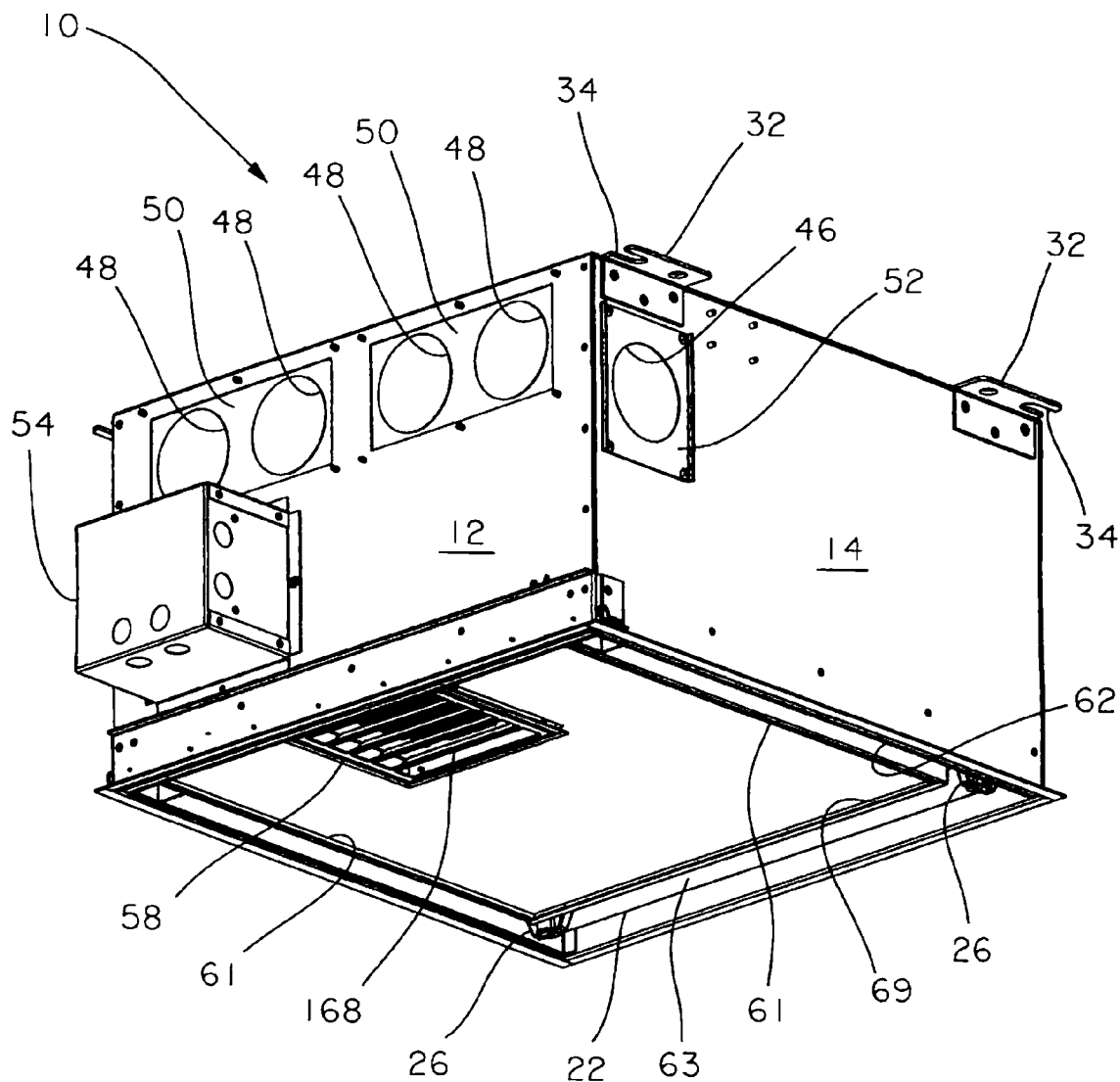
FIG. 1 is a bottom perspective view of the in-ceiling zone cabling enclosure of the present invention, shown with the access door closed.
Figure 4:
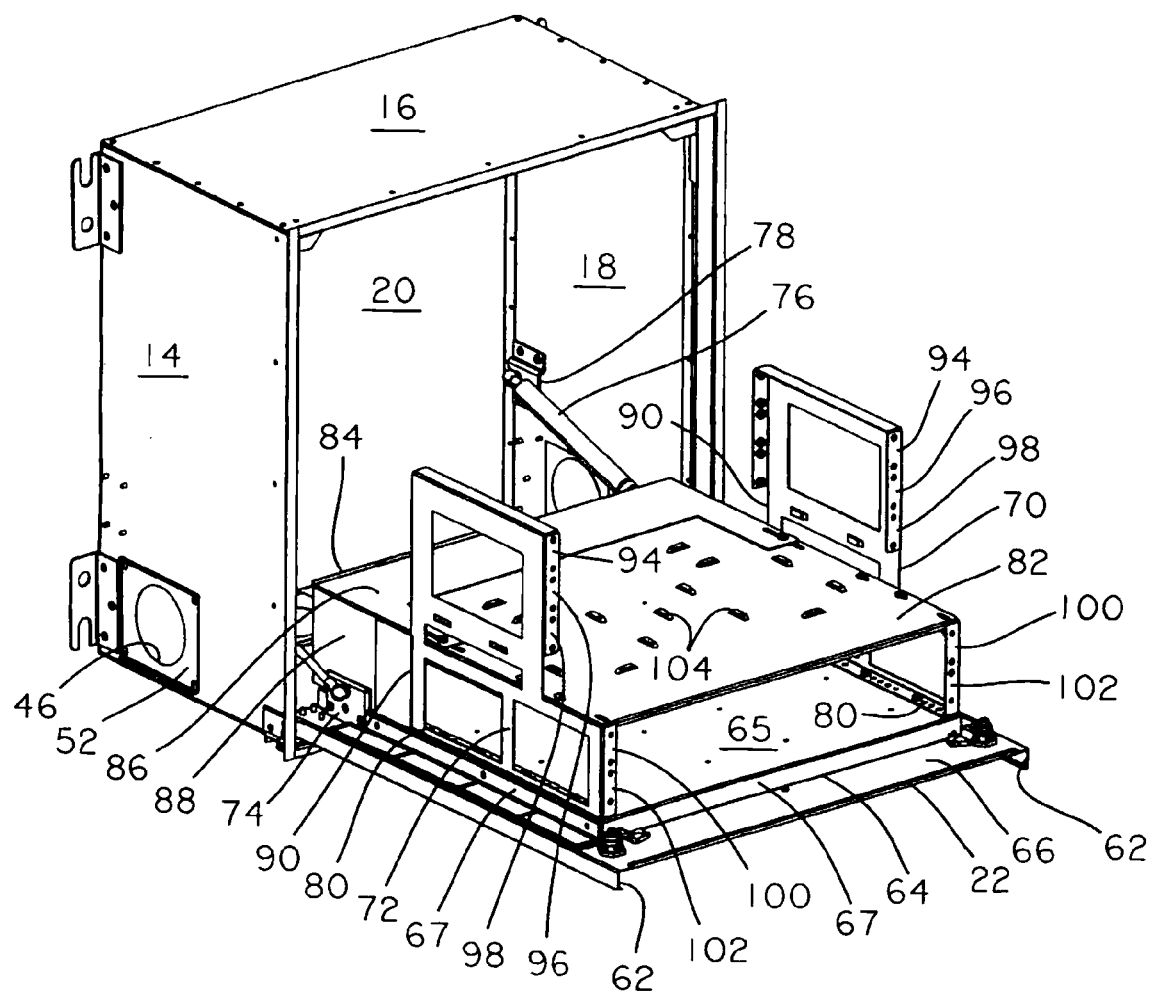
FIG. 4 is a perspective view of the in-ceiling enclosure of FIGS. 1, 2 and 3, showing the access door in the open position, and the equipment mounting and slack management assembly mounted on the equipment plate of the access door.
Figure 16:
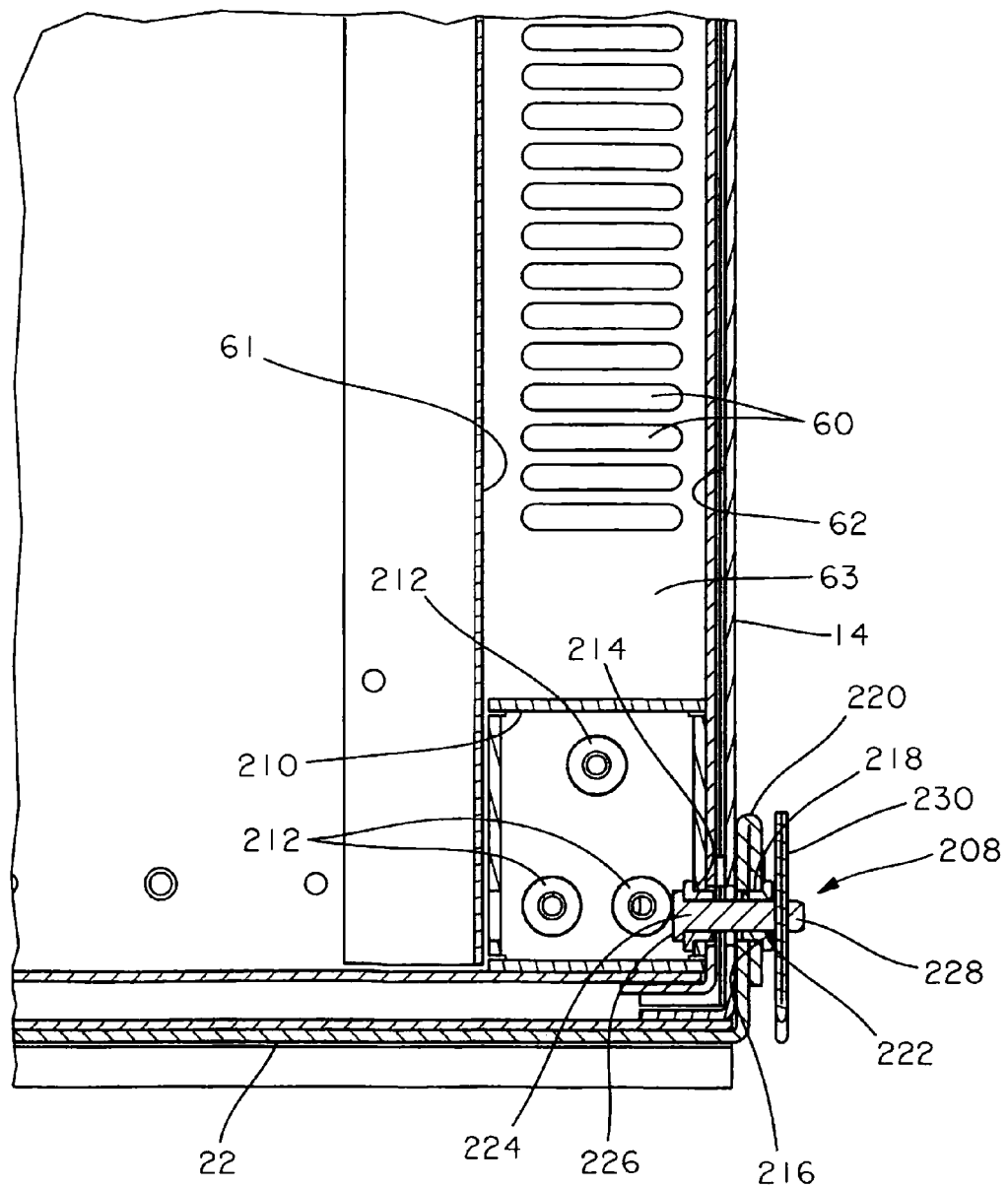
FIG. 16 is a detail view of the hinge and hinge support assembly pivotally mounting the access door to the in-ceiling enclosure.

Referring to FIG. 1, an embodiment of the in-ceiling zone cabling enclosure of the present invention, for both active and passive equipment, is generally designated by the numeral 10. Enclosure 10 is bounded by four upstanding walls: rear wall 12, side wall 14, front wall 16 and side wall 18, that provide a generally square shape to the enclosure and create a volume in the enclosure. Enclosure 10 also is bounded by a top panel 20 attached to each of the walls 12, 14, 16 and 18, and an access door assembly 22 is pivotally attached to the bottom of rear wall 12 by means of hinges 24 (FIG. 2) or any other suitable pivotal attachment mechanisms as are known in the art, such as the hinge pin shown in FIG. 16. In one embodiment, access door assembly is pivotally attached to opposed side walls 14 and 18 (FIGS. 4, 16). Access door assembly 22 is held in its closed position against the bottom edges of walls 12, 14, 16 and 18 by a pair of wing nut operated latch assemblies 26. In the illustrated embodiment, lock latch assemblies 26 include key locks, thus providing limited access to the volume inside of enclosure 10 through access door assembly 22.

Figure 2:
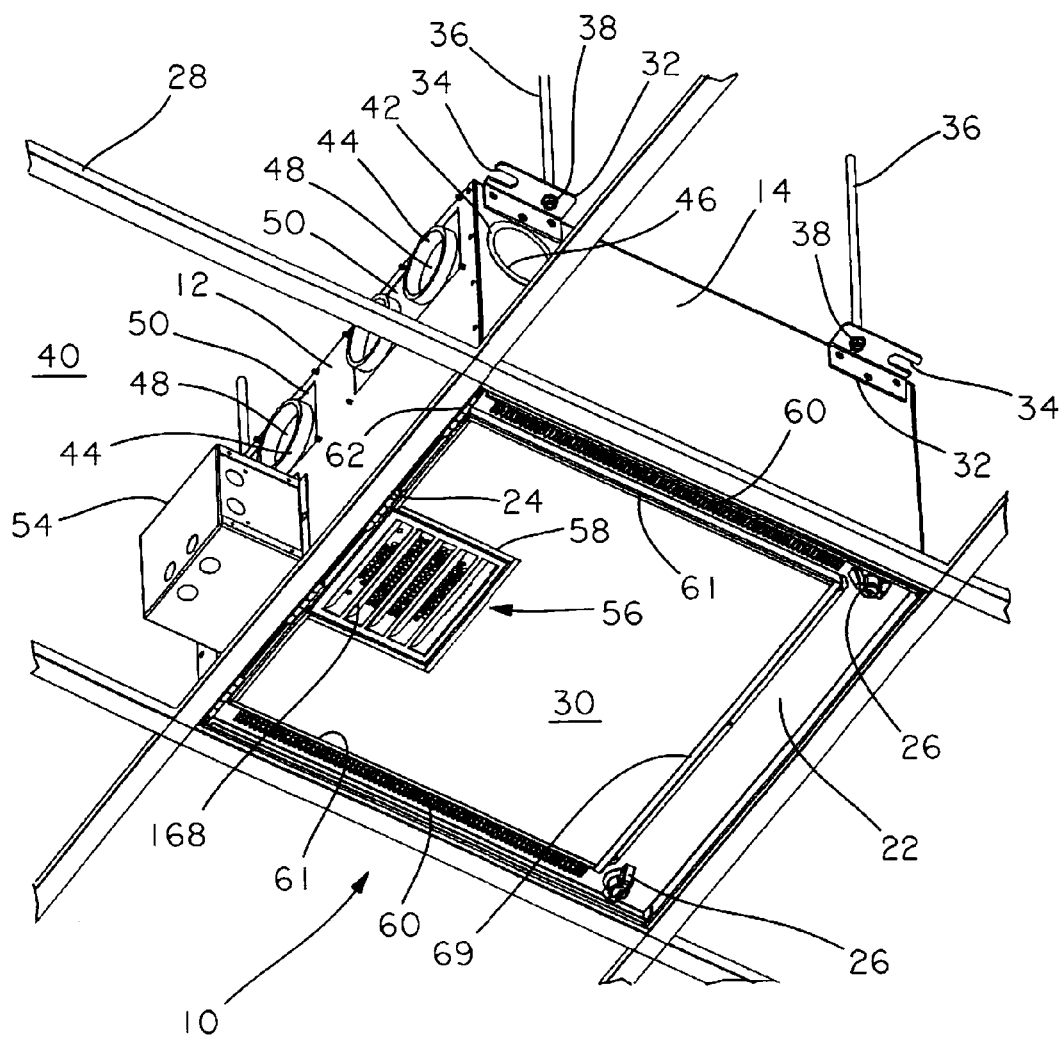
FIG. 2 is a bottom perspective view of the in-ceiling zone cabling enclosure of the present invention, shown with the access door closed and the enclosure installed in the air handling space above a drop ceiling tile bracket grid.
Figure 3:
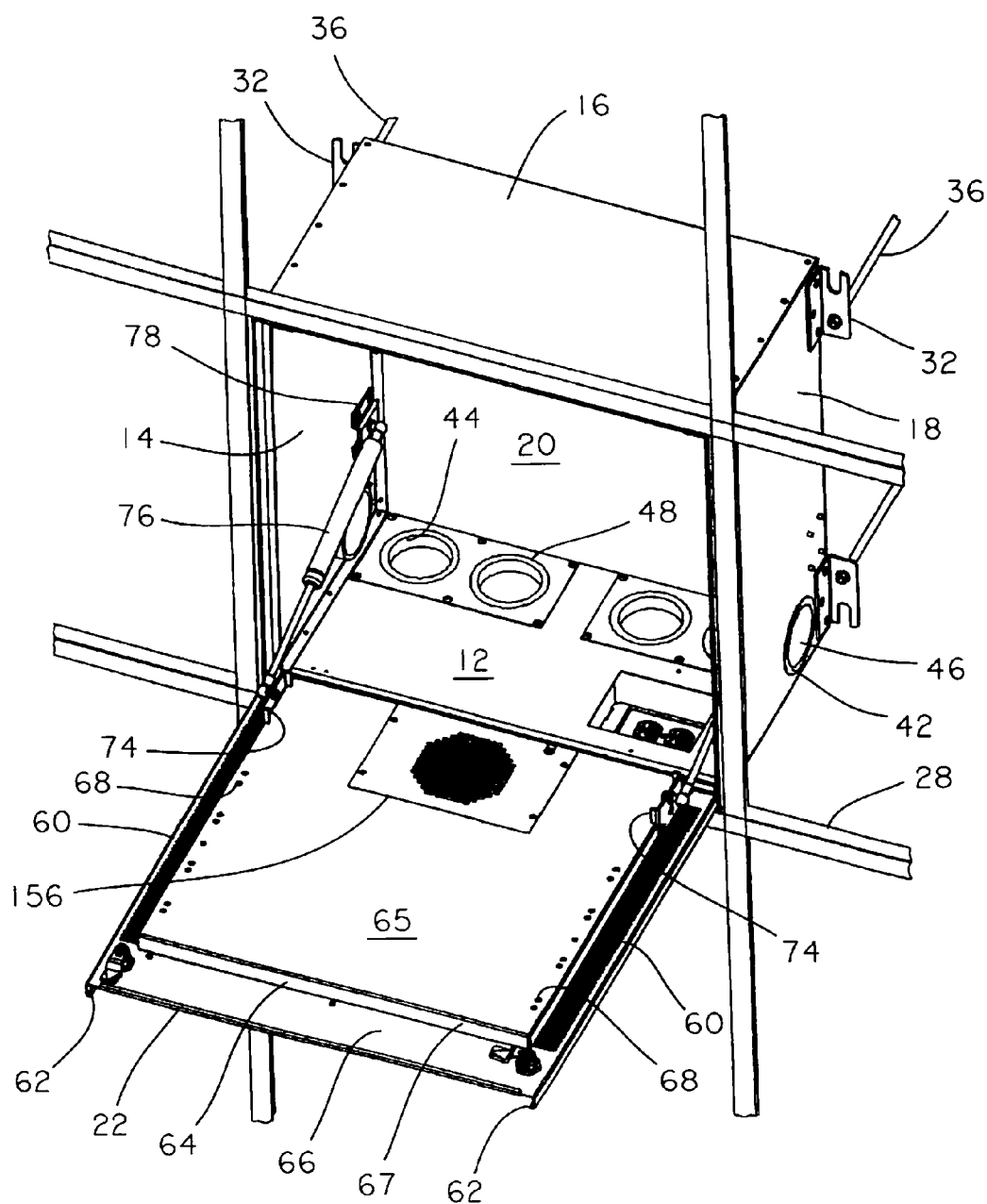
FIG. 3 is a bottom perspective view of the in-ceiling enclosure of FIGS. 1 and 2, shown with the access door open, and without the equipment mounting and slack manager assembly of the present invention.

As seen in FIGS. 1-3, enclosure 10 is adapted to be installed in one section of drop ceiling tile bracket grid 28 which supports ceiling tiles 30 (FIG. 5) of the drop ceiling. Drop ceilings of the type disclosed usually define tile sections having a two foot by two foot horizontal dimension, although other dimensions may be used. As a result, enclosure 10 is approximately two feet by two feet square to fit into a square formed by four members of grid 28, as seen in FIG. 2. Referring to FIGS. 1, 2 and 3, a pair of mounting brackets 32 are fastened to the top of each of side walls 14 and 18. Each bracket 32 includes a horizontally disposed slot 34. Rods 36 are anchored to and extend downward from the original ceiling of the building structure (not shown). The lower end of each rod 36 is threaded, and the threaded portion of each rod is inserted into a corresponding slot 34 of a bracket 32. In the illustrated embodiment, a nut and washer (not shown) are threaded onto the threaded portion of each rod 36, with this nut and washer disposed above bracket 32. A second nut and washer 38 is threaded onto rods 36 beneath bracket 32, with each bracket 32 lodged between corresponding tightened nuts and washers. In this manner, enclosure 10 is supported from the original ceiling in the air handling space 40, whereby access door assembly 22, when closed, is substantially aligned with ceiling tile bracket grid 28, as seen in FIG. 2.

Cable ingress and egress into and out of the enclosure 10 is through a plurality of open grommets 42, 44 circumscribing apertures 46, 48 in side walls 14, 18 and rear wall 12 (FIG. 2). Apertures 46 are located through side walls 14 and 18, and apertures 48 are disposed in rear wall 12. In the embodiment illustrated in FIGS. 2 and 3, apertures 48 and grommets 44 on the rear wall 12 are installed on removable plates 50, allowing different configurations that the end user can utilize as required. As seen in FIG. 1, removable plates 52 can also be installed on side walls 14, 18 to accommodate apertures 46.

In addition, an electrical outlet box 54 is supported on rear wall 12 (FIGS. 1, 2) to provide power to active equipment installed in enclosure 10, as will be explained. The side of outlet box 54 attached to rear wall 12 includes a plurality of sockets (not shown) extending through a suitable aperture in rear wall 12 to provide ease of connectability with the active equipment power cords in the enclosure 10.

An air exhaust fan assembly 56, including an exhaust air deflector 58, is installed in the access door assembly 22, as will be explained in further detail, to remove hot air generated in the enclosure 10 by active equipment operating in the enclosure. The access door assembly 22 also includes a plurality of air intake vents 60 (FIG. 2) extending through the door assembly 22 to provide access for cool air entering the interior volume of enclosure 10 by convection when active equipment is operating inside the enclosure, as will be explained in further detail.

Figure 12:
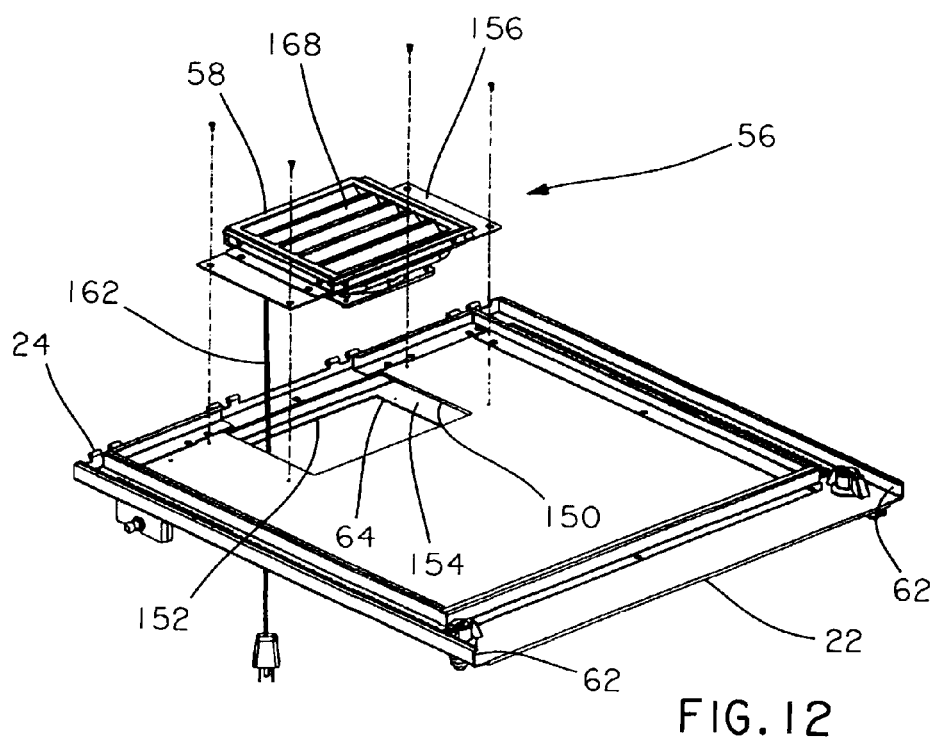
FIG. 12 is a bottom exploded view of the access door and air exhaust fan assembly of the present invention, showing the positions of the air intake, and of the louvers of the exhaust air deflector directing exhaust air away from the air intake vents.

Referring to FIGS. 1, 2, and 12, the downwardly facing side of access door assembly 22 includes a pair of parallel, inwardly facing U shaped slots 62 extending downward from the door assembly. Slots 62 are adapted to stiffen door assembly 22 against bending or buckling under the weight of the equipment installed in enclosure 10. A pair of opposed U shaped ceiling tile brackets 61 are attached to the underside of access door assembly 22, and are located to the inside of air intake vents 60, creating a space 63 between slot 62 and brackets 61. A channel is formed between tile brackets 61, and this channel is adapted to slidably receive and hold a ceiling tile 30 of the same color and texture as the extant ceiling tiles 30. The ceiling tile 30 installed between brackets 61 includes a preformed cutout that extends around, and does not block, air exhaust fan assembly 56. After tile 30 has been installed between brackets 61, a ceiling tile cap 69 is attached to access door assembly 22 to maintain ceiling tile 30 in its proper position on access door assembly 22.

FIG. 3 illustrates the enclosure 10 installed in a ceiling grid 28, with access door assembly 22 in the open position attained by unlocking lock latch assemblies 26 and rotating door assembly 22 ninety degrees about hinges 24. An equipment mount plate 64 is permanently attached to the inside, or upper surface 66, of door assembly 22. Equipment mount plate 64 comprises a flat surface 65 and roll formed edges 67 (FIGS. 3, 4) extending downward from flat surface 65. When equipment mount plate 64 is attached to upper surface 66 of door assembly 22, a space of approximately one inch, in the illustrated embodiment, exists between upper surface 66 of the door assembly and equipment mount plate 64. Equipment mount plate 64 is pre-punched with a plurality of apertures 68 to accommodate the installation of left and right side equipment mount rails 70, 72 (FIG. 4) in a plurality of locations as will be explained in further detail.

A pair of mounting brackets 74 (FIGS. 3, 4) are attached to opposing sides of equipment mount plate 64. Two gas piston dampers 76 are pivotally mounted to brackets 74 at one end, and to brackets 78 attached to side walls 14, 18 at an opposite end of each damper. Gas piston dampers 76 aid in opening and closing access door assembly 22 at a controlled speed when network equipment is installed in enclosure 10. The additional weight of the network equipment in an overhead position requires the need to slow the access door assembly 22 from opening too quickly and abruptly.

As will be explained in further detail, air circulation exhaust fan assembly 56 is installed in the space between upper surface 66 of access door assembly 22, and equipment mount plate 64. The exhaust fan assembly is positioned to be adjacent the exhaust fan of the active equipment installed in enclosure 10, to be described. The air intake vents 60 in door assembly 22 are located in alignment with the side air intake vents of the active equipment.

FIG. 4 shows the enclosure 10 configured for active and passive equipment. Left and right equipment mount rails 70, 72 are attached at opposed sides directly to equipment mount plate 64. Each equipment rail 70, 72 includes a bottom flange 80 having a plurality of apertures aligned with apertures 68 in flat surface 65 of equipment mount plate 64. In the illustrated embodiment, equipment mount rails 70, 72 are attached to plate 64 using self tapping screws; however, other suitable attachment means can be used as are known in the art. The pattern of apertures in bottom flange 80 is spaced to permit equipment mount rails 70, 72 to be moved backward and forward prior to being attached to plate 64, to allow active and passive equipment of varying depths to be installed in enclosure 10. The equipment mount rails 70, 72 are positioned toward the front to accommodate deeper active equipment, for example, active switches seventeen and a half inches deep. The rails 70, 72 are mounted toward the back of mount plate 64 for shallower active equipment, for example, active switches fifteen and a half inches deep or less. The rails 70, 72 are stepped from front to back, allowing two rack units of active equipment of up to seventeen and a half inches deep in the illustrated embodiment to be installed.

As seen in FIG. 4, an integrated horizontal slack management tray 82 is attached to, and extends between, equipment mount rails 70, 72. The slack management tray 82 has several purposes, one of which is to separate the active equipment in the enclosure 10 from the passive patch panels installed in enclosure 10. Another purpose of slack management tray 82 is to effectively manage patch cord slack, enabling one size patch cord length to be used when connecting the passive patch panel and sockets to the active equipment sockets, as will be explained. Slack management tray 82 allows front only moves, additions or changes to the cabling, allowing the user a greater opportunity to maintain the quality of cable connections between the active and passive equipment installed in enclosure 10. A further purpose of slack management tray 82 is to maintain the cables in enclosure 10 away from the side vertical air intake channels of the enclosure above air vents 60, improving cooling air intake into and movement across the heat generating active equipment in enclosure 10.

Figure 5:
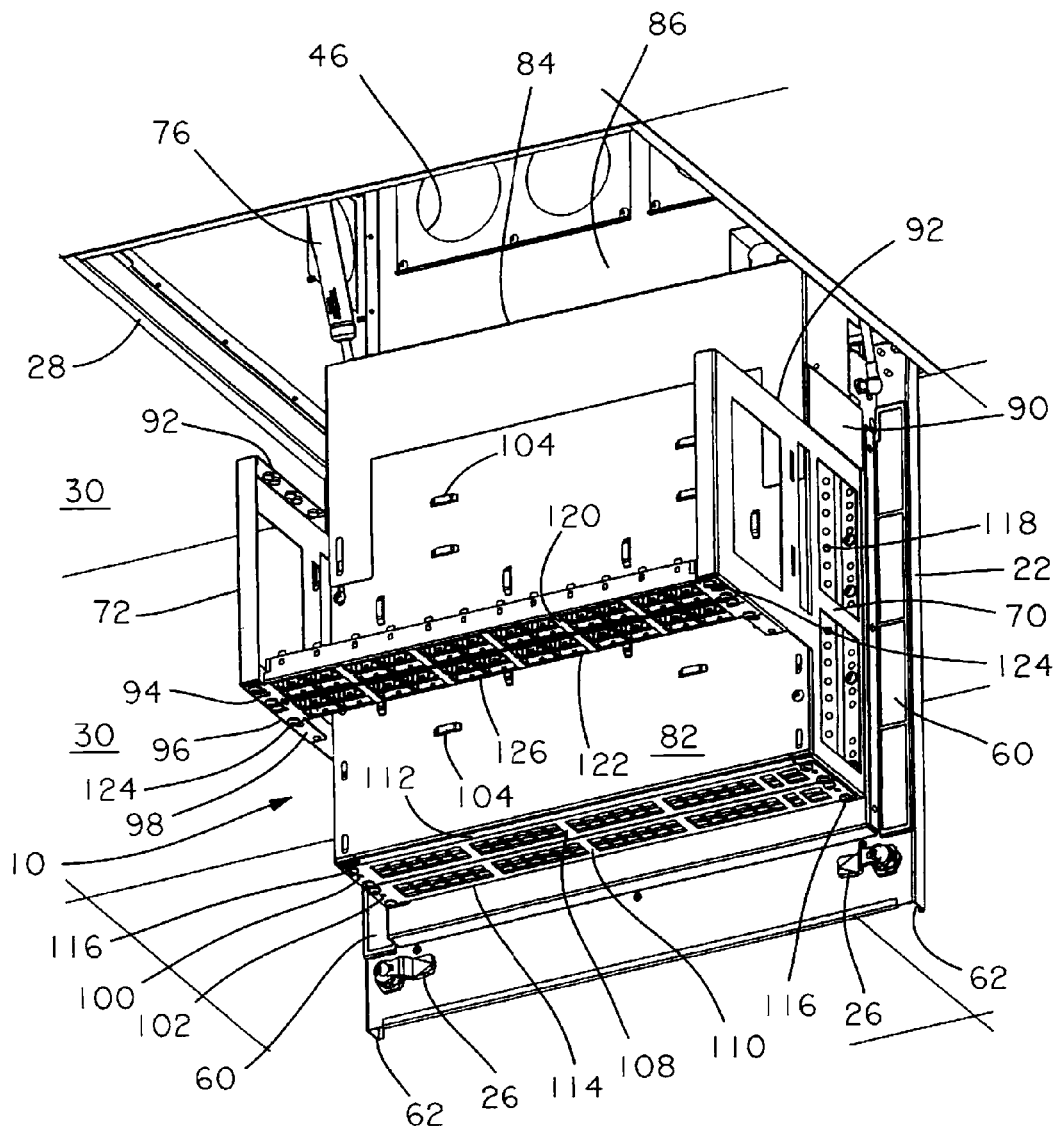
FIG. 5 is a bottom perspective view of the in-ceiling enclosure of FIGS. 1-4, showing two patch panels and two PoE enabled switches mounted on the equipment mounting and slack management assembly of FIG. 4.

Referring to FIG. 4, an air dam 84 is located behind slack management tray 82 to close off the sub volume in which the active equipment is installed on equipment mount plate 64, as seen in FIG. 5. Air dam 84 includes an upper surface 86, and downwardly extending side plates 88 toward the rear of surface 86. Each side plate 88 includes a forward facing slot portion 90 (FIG. 5) adapted to receive the rear edge 92 of respective equipment mount rails 70, 72 as the front to back position of the mount rails on equipment mount plate 64 is altered. Air dam 84 creates a sub volume in enclosure 10 between upper surface 86 of the air dam and side plates 88, which volume directs hot exhaust air developed by the active equipment directly to the air exhaust fan assembly 56 (FIG. 1). The air dam 84 is positioned to abut and seal against rear wall 12 when access door assembly 22 is closed.

Figure 17:
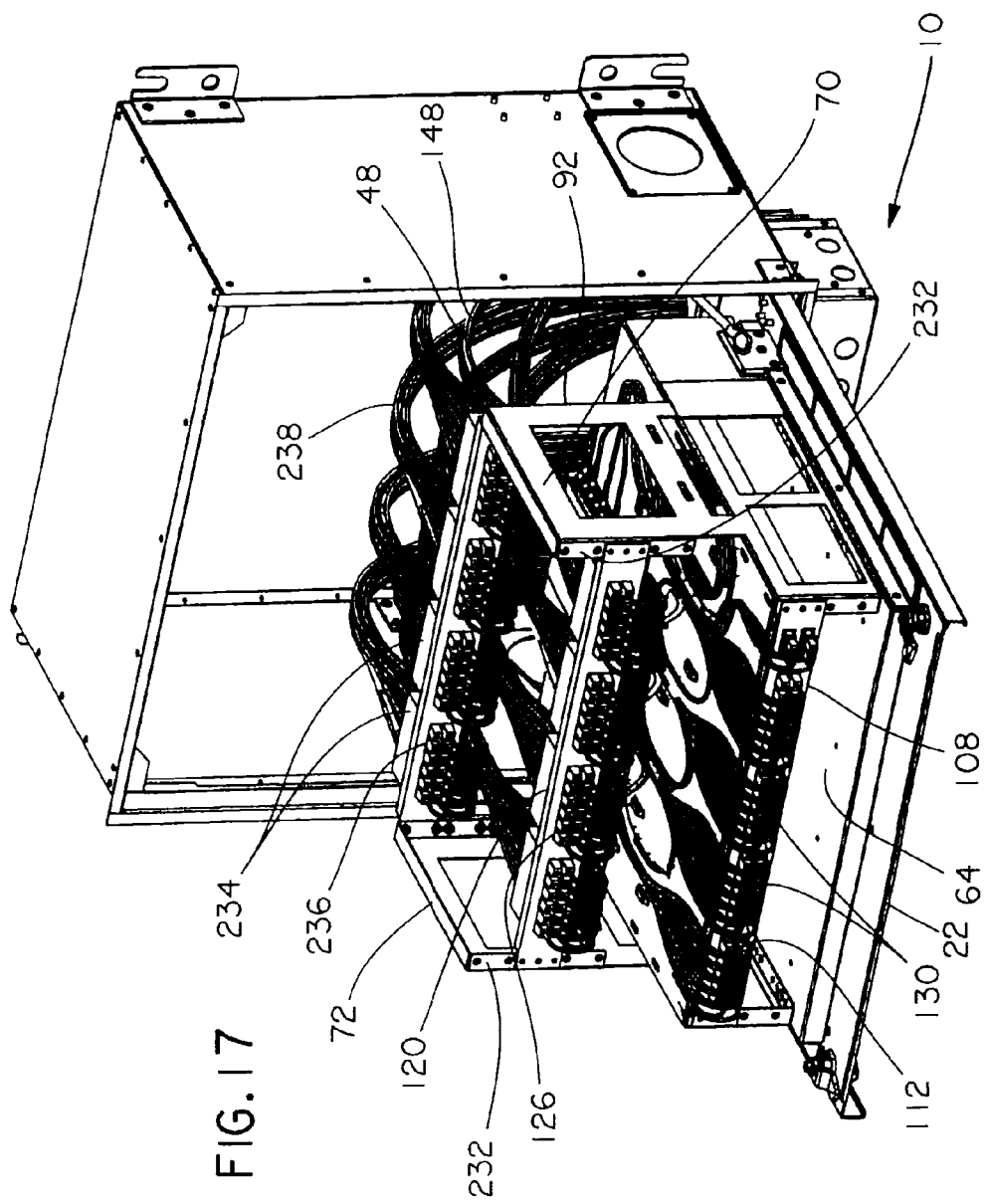
FIG. 17 is a perspective view of the in-ceiling enclosure of the present invention, showing multiple patch panels attached to the equipment mounting and slack manager assembly.

In the embodiment disclosed in FIG. 4, three rack units 94, 96, 98 of space are provided to attach equipment up to thirteen and a half inches deep at the top of equipment mount rails 70, 72 or six rack units of passive equipment (FIG. 17). Two rack units 100, 102 of space are provided to attach active equipment at the bottom of mount rails 70, 72. The stepped configuration of equipment mount rails 70, 72 allows the passive equipment mounted at the top of the mount rails to clear the front wall 16 of enclosure 10 when access door assembly 22 is opening and closing with the speed of the access door assembly controlled by gas piston dampers 76.

Referring to FIG. 4, horizontal slack management tray 82 includes a plurality of shear-forms 104 comprising hook-like members adapted to receive cable straps 106 (FIG. 8) wrapped around a cable bundle inside enclosure 10, and hold the cable bundle against migration. Shear-forms 104, as will be explained, are utilized to ensure that the cable bundles inside enclosure 10 are efficiently managed.

Figure 6:
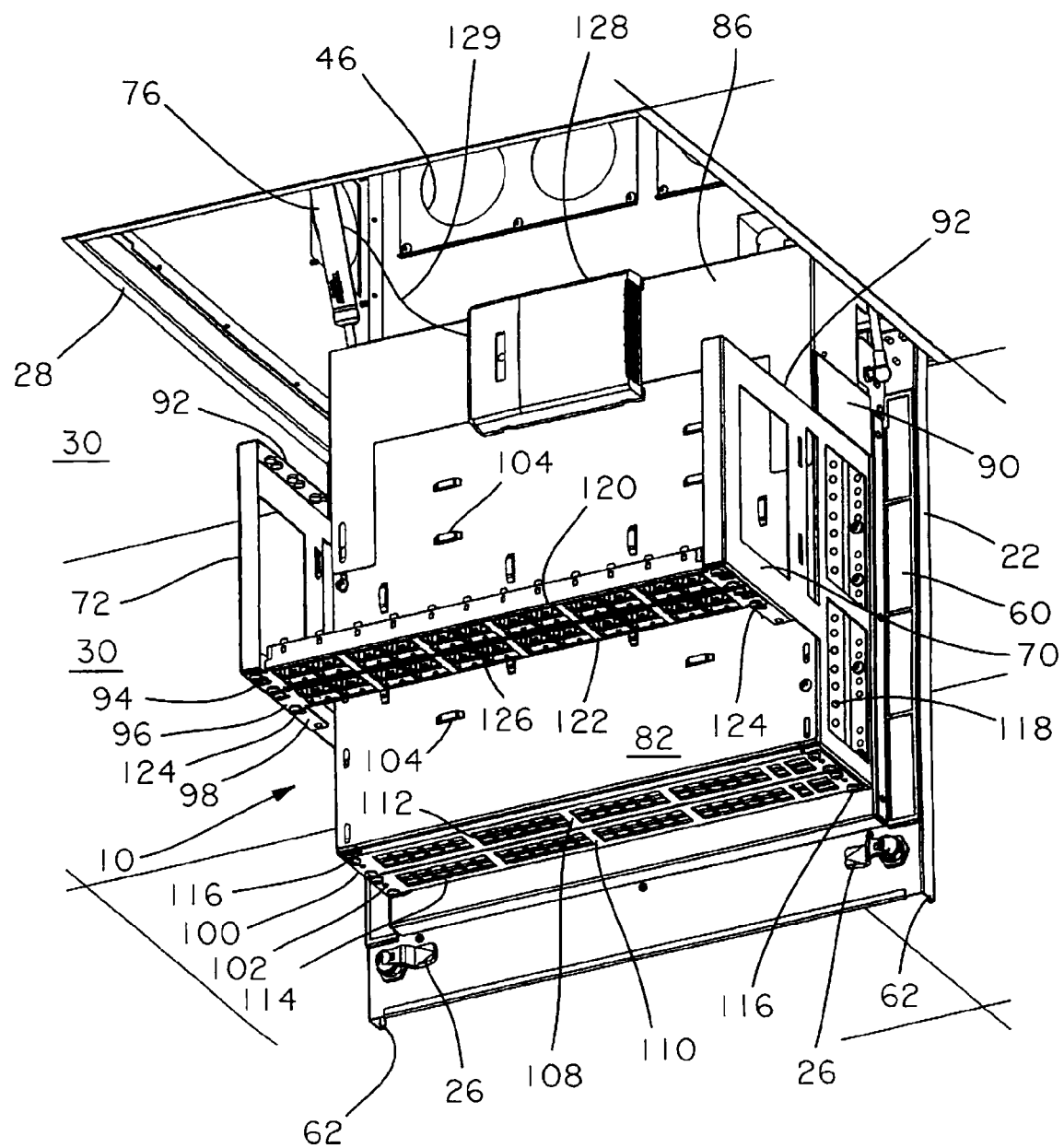
FIG. 6 is a bottom perspective view of the in-ceiling enclosure of FIG. 5, showing a fiber termination box attached to the rear of the integrated horizontal slack managing tray which forms part of the active equipment mounting and slack management assembly of the present invention.

FIGS. 5 and 6 illustrate enclosure 10 mounted in the air handing space 40 above drop ceiling grid 28, with access door assembly 22 in its full open position and active equipment 108, 110 and passive equipment 120, 122 installed in the enclosure. In FIGS. 5 and 6, the active equipment comprises two network switches 108, 110 having a plurality of input and output sockets 112, 114 mounted in the portion of the switches 108, 110 facing outward towards a user when access door assembly 22 is in the open position. Switch 108 is mounted to equipment mount rails 70, 72 at rack unit 100 (FIG. 4), and switch 110 is mounted to equipment mount rails 70, 72 at rack unit 102 by means of self tapping screws 116 (FIGS. 5, 6), or other suitable attachment means as are known in the art. While the active equipment installed in enclosure 10 is shown as a pair of network switches 108, 110, it is understood that other active equipment, such as Uninterrupted Power Supplies (UPS), for example, could also be installed at rack unit 100, in place of switch 108.

In the illustrated embodiment of FIGS. 5 and 6, switches 108, 110 include air intake vents 118 laterally disposed an opposite sides 120 of each network switch 108, 110. Air intake vents 118 are disposed directly above air intake vents 60 located on opposite sides of switches 108, 110 in access door assembly 22 so that cooling air passes unimpeded from beneath the access door assembly 22 when in the closed position to air intake vents 118 of the active equipment. As will be explained, the cable management system of the present invention keeps cables away from the vertical volume between air intake vents 60 in access door assembly 22, and away from the air intake vents 118 in switches 108, 110.

Referring again to the embodiment of the present invention disclosed in FIGS. 5 and 6, the passive equipment installed in enclosure 10 comprises two patch panels 120, 122 mounted by self tapping screws 124, or the like, to rack units 94 and 96 of equipment mount rails 70, 72. Each patch panel 120, 122 includes a plurality of pass through sockets 126 opening on both sides of the patch panels. The sockets 126 are adapted to receive the plug end of cables leading to and from the patch panels 120, 122. In the embodiment illustrated in FIGS. 5 and 6, the two patch panels 120, 122 are shown mounted to equipment mount rails 70, 72; however, if desired, the number of patch panels 120, 122 installed in enclosure 10 could be up to six. As is known, passive patch panels 120, 122 do not generate heat.

FIG. 5 and FIG. 6 are similar, except that FIG. 6 shows a placement of fiber termination box 128 located above air dam 84. While not shown, fiber termination box 128 can also be located on the outside portion of either equipment mount rail 70, 72. Fiber termination box 128 is connected to incoming signal cables 129 routed from outside the enclosure 10 to box 128 with sufficient slack to accommodate the opening of access door assembly 22.

Figure 7:
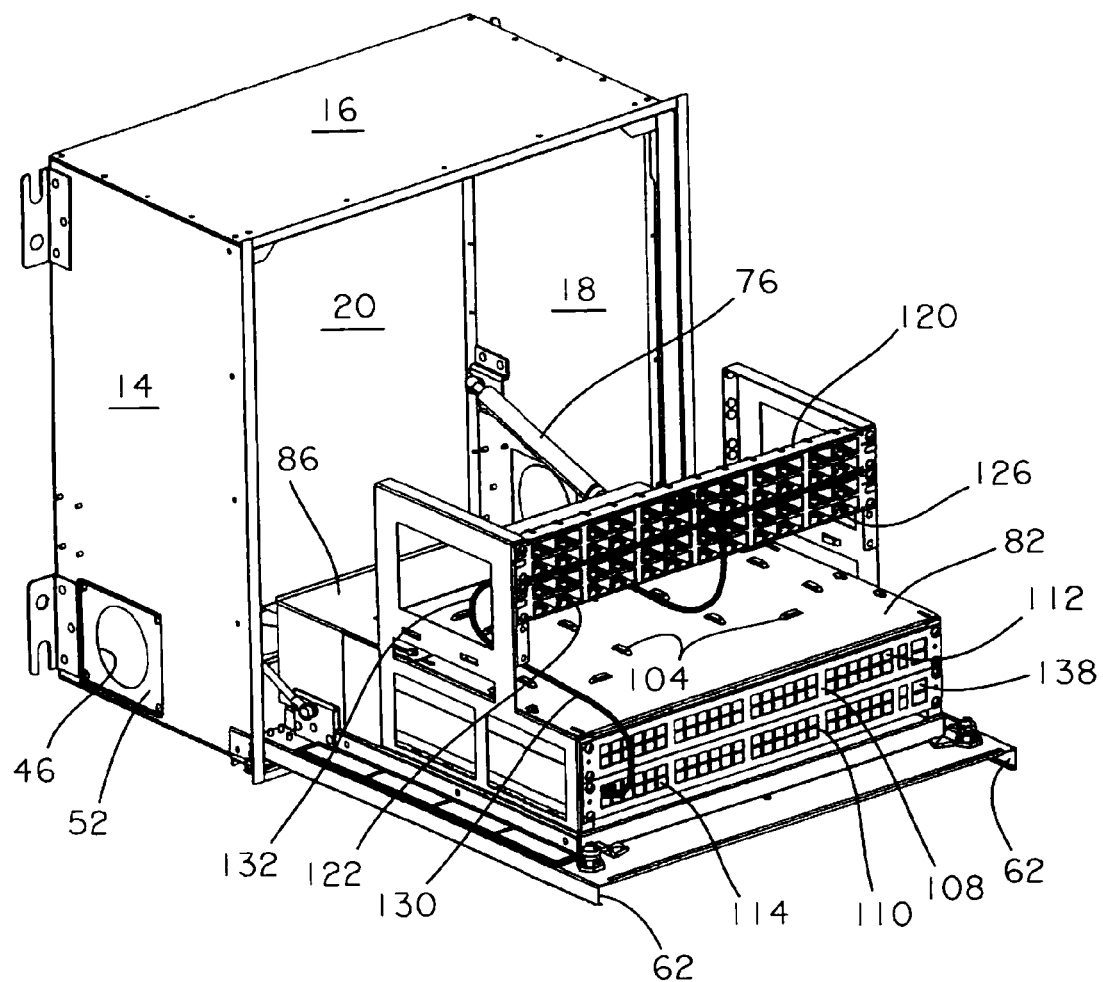
FIG. 7 is a perspective view of the in-ceiling enclosure of the present invention and similar to FIG. 5, showing the access door open and a single cable connection between the switch and the patch panel.
Figure 8:
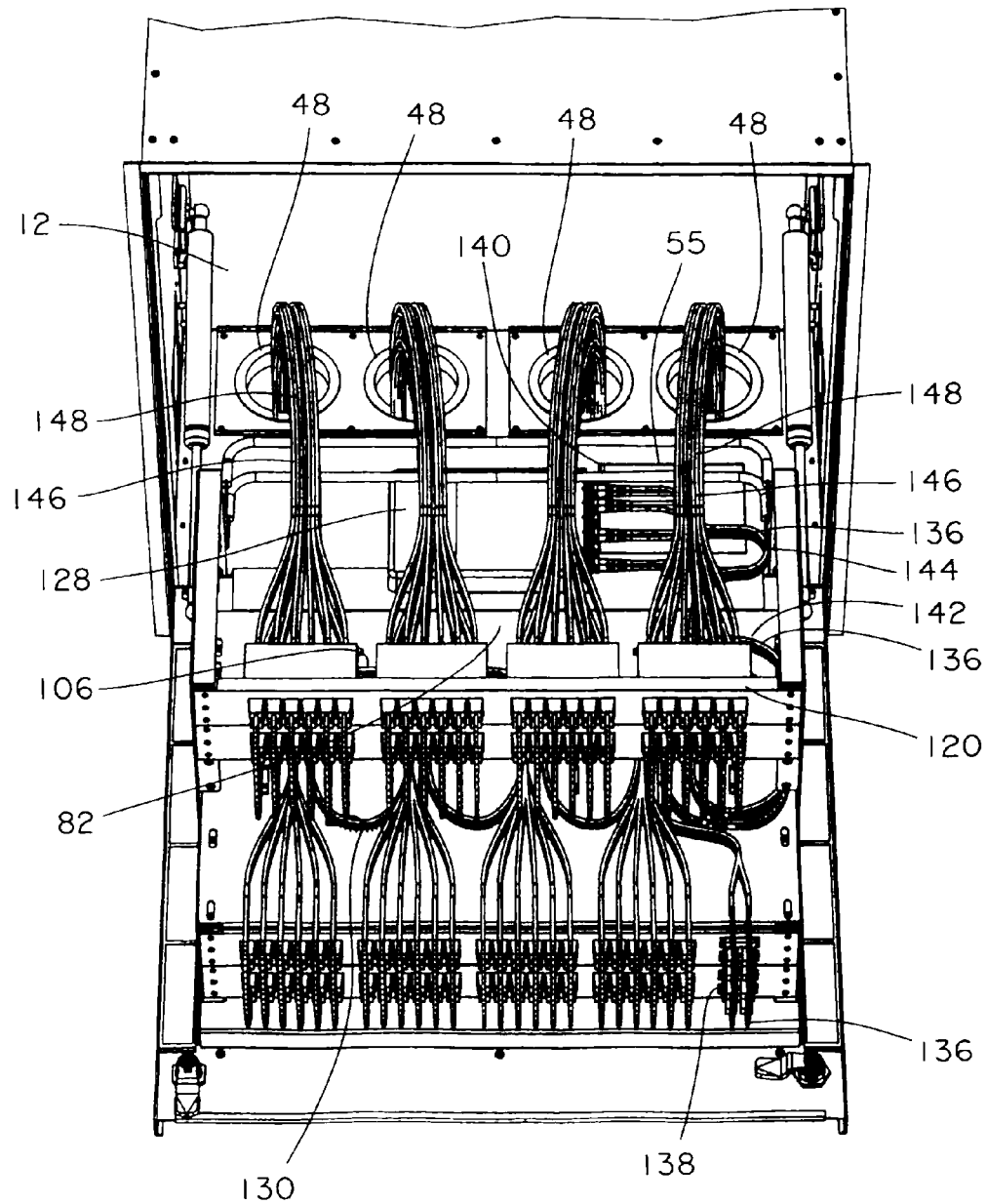
FIG. 8 is a front perspective view of the in-ceiling enclosure shown in FIGS. 1-7, showing the access door open and a full compliment of wire connections between the switch apparatus, the patch panel, and the wires ingressing and egressing the enclosure.
Figure 9:
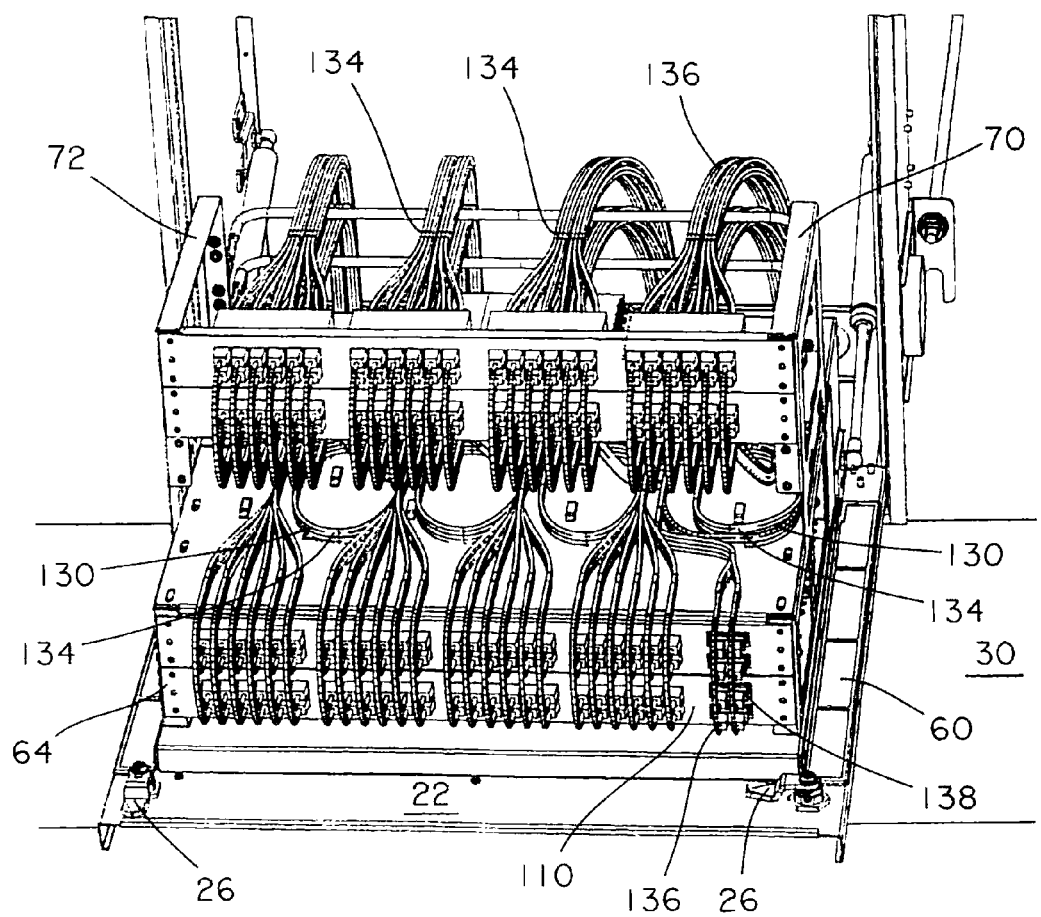
FIG. 9 is a front perspective view of the in-ceiling enclosure shown in FIG. 8, illustrating the full compliment of wires connected between the switch apparatus and the patch panel.

FIG. 7 illustrates the initial step in installing cabling between the active network switch 110 and one of the patch panels 120. A cable 130 having suitable plugs on both ends has one end inserted into a socket 114 of switch 110. Cable 130 is then routed across the upper surface of horizontal slack management tray 82 in a rearward extending loop 132. The cable 130 is then brought forward along slack management tray 82, and the second end of cable 130 is inserted into a predetermined socket 126 of patch panel 120. This process is repeated until a plurality of cables 130 are connected between sockets 114 of switch 110 to sockets 126 of patch panel 120, and between sockets 112 of switch, or UPS, 108 to sockets 126 of patch panel 122 in the illustrated embodiment shown in FIGS. 7, 8 and 9. As seen in FIG. 9, various quantities of cables 130 are formed into cable bundles and each bundle is held together by a cable strap 134. As each bundle of cable loops 132 traverses horizontal slack management tray 82, the cable strap 134 holding each bundle in place is inserted into an adjacent shear-form 104 (FIG. 7), and the shear-form 104 holds each cable bundle in place on slack management tray 82, as seen in FIGS. 8 and 9. Due to the loops 132 in cables 130, the cables 130 remain crimp-free, and relative movement of the cables is allowed between active equipment 108, 110 and patch panels 120, 122, if required.

In the illustrated embodiment of FIGS. 7-9, a total of ninety-six ports are provided in active equipment 108 and 110, when both are network switches. The shear-forms 104 manage the slack of cables 130 within the enclosure without the need for additional cable managers.

Also, the user is allowed to standardize on the length of cables 130, which reduces the cost of the systems installed in enclosure 10. In addition, the bundles of cables 130 are held in place over horizontal slack management tray 82, and are kept away from air intake vents 60, thus permitting proper ventilation of the heat generating active equipment 108, 110 in enclosure 10.

FIGS. 8 and 9 illustrate the uplink fiber cables extending between the fiber termination box 128 and the fiber connection ports 138 in network switch 110. Each uplink fiber cable comprises a bundle of fiber cables 136 that are connected at one end to the output 140 of termination box 128. The bundle of fiber cables 136 then extends across horizontal slack management tray 82 from the back to the front of enclosure 10, forming a smooth loop 142. The bundle of fiber cables 136 are encircled by a plurality of spaced apart cable straps 144 (FIG. 8) that are inserted into adjacent shear-forms 104 on slack management tray 82 in the same manner that cables 130 are held to slack management tray 82 by cable straps 134. In this manner, uplink cable bundles 136 are held in a secure position on slack management tray 82 without interfering with the cooling airflow paths in enclosure 10, and without interfering with the other cable bundles in the enclosure.

FIG. 8 illustrates the bundles 146 of egress cables 148 that, in the illustrated embodiment, are connected to sockets 126 located at the rear of patch panels 120, 122. Cable bundles 146 are routed through open apertures 48 in rear wall 12 from the back of passive patch panels 120, 122. Cable bundles 146 flow so that there is a minimum of bends required to reach the patch panels, thereby reducing the force required to open and close access door assembly 22. The cable bundles 146 are provided with sufficient slack by forming a loop outside of enclosure 10 to allow access door assembly 22 to rotate through a full ninety degrees when the door assembly is opened. In the illustrated embodiment, a minimum of approximately fourteen inches of cable slack between a cable tie-down bar (not shown) outside of enclosure 10 and rear wall 12 of the enclosure is deemed sufficient. The location of apertures 48 in rear wall 12 ensures that cable bundles 146 do not interfere with the cooling air circulation paths created through the enclosure and through the active equipment.

Figure 10:
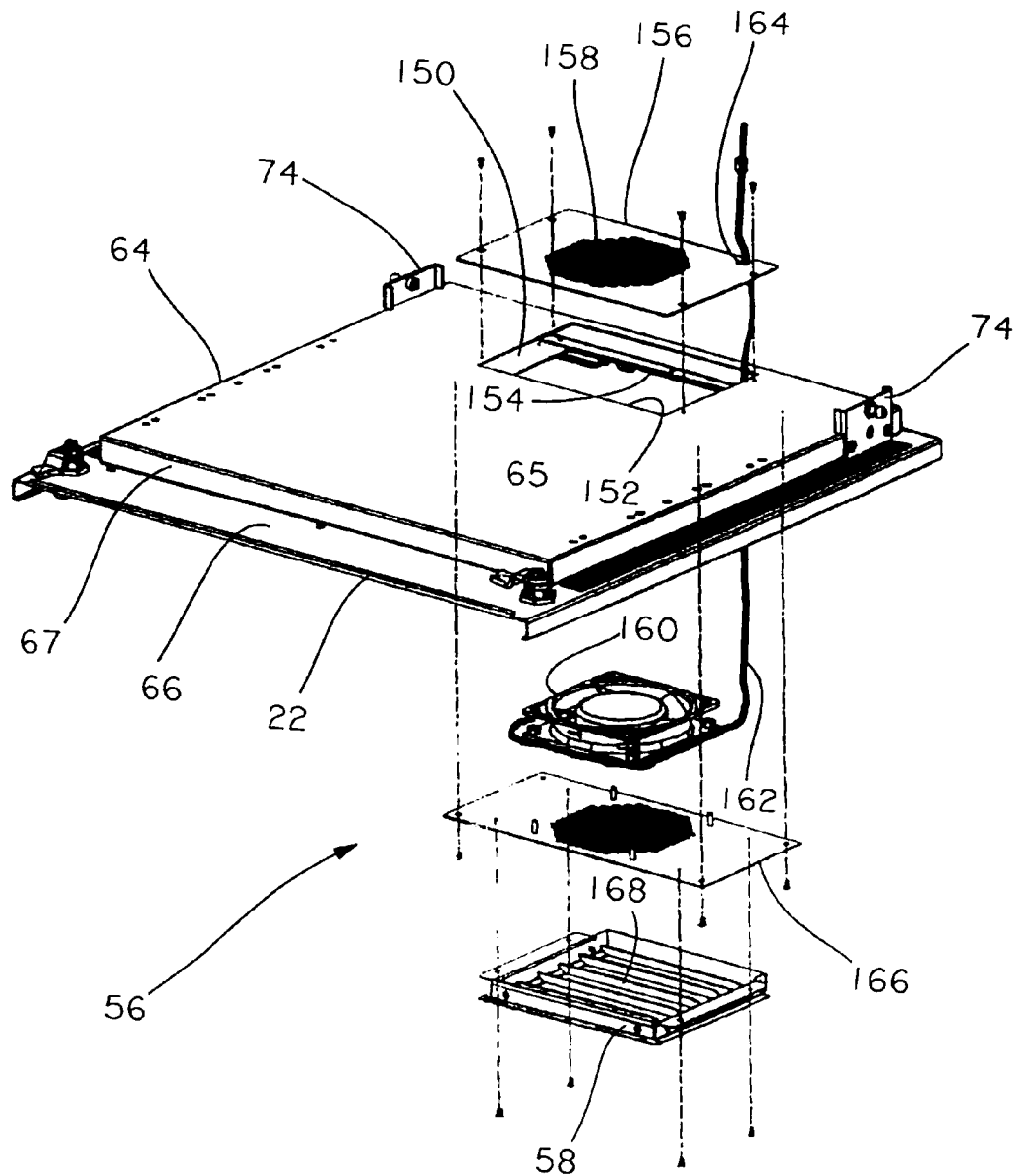
FIG. 10 is an exploded perspective view of the access door of the in-ceiling enclosure of FIGS. 1-9, showing the fan screen, air exhaust fan, fan mount plate and exhaust air deflector.
Figure 11:
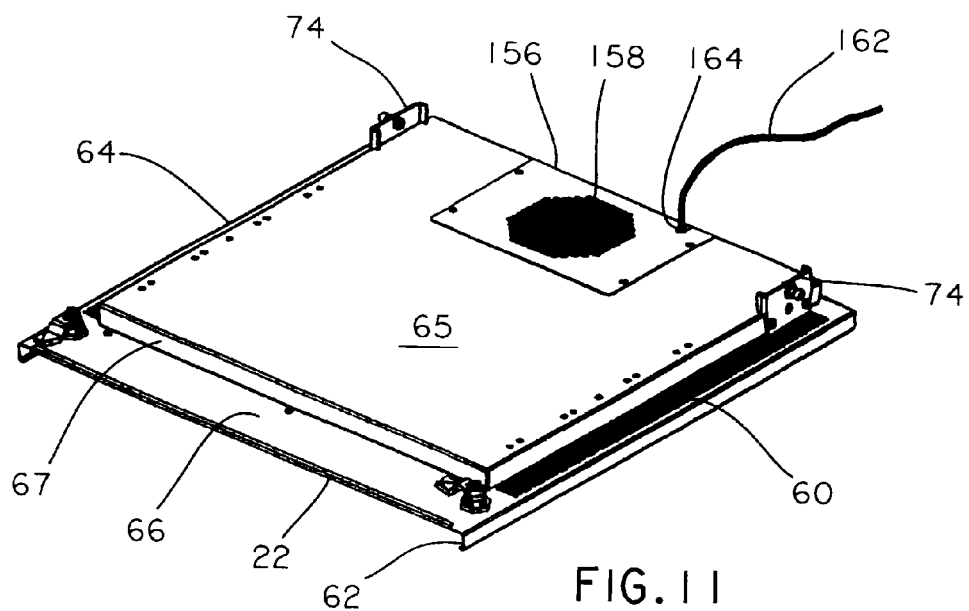
FIG. 11 is an upper perspective assembly view of the access door of the present invention with the air exhaust fan and screen mounted in the access door.

FIGS. 10, 11 and 12 illustrate the components and assembly of the air exhaust fan assembly 56 (FIGS. 1, 2) in access door assembly 22, which forms part of the air handling and thermal management system of enclosure 10. As seen in FIG. 12, a space 150, approximately one inch in depth, is disposed between flat surface 65 of equipment mount plate 64 and upper surface 66 of access door assembly 22. A substantially rectangular aperture 152 is cut out of equipment mount plate 64, and an aligned substantially rectangular aperture 154 is formed in upper surface 66 of access door assembly 22. A fan screen plate 156 having a screened aperture 158 is attached to equipment mount plate 64 over aperture 152. An air circulation fan and fan motor assembly 160 is mounted through aperture 154 in space 150 between the access cover assembly 22 and equipment mount plate 64, thus maximizing the space available for equipment inside enclosure 10 by eliminating the need for internal duct work. A power cord 162 extends through apertures 152, 154 and through an aperture or slot 164 in fan screen plate 156. Power cord 162 may be connected to one of the sockets (not shown) in electrical outlet box 54 (FIGS. 1, 2). A fan mount plate 166 is attached to the outer surface of access door assembly 22, and provides a base for mounting air circulation fan assembly 160 to the door assembly. As seen in FIGS. 1 and 2, exhaust air deflector 58 is mounted to access door assembly 22 directly over fan assembly 160. Air deflector 58 includes a plurality of louvers 168 that direct the hot air exhausted by fan assembly 160 towards the rear of enclosure 10 and into the room below the enclosure, but not directly onto people in the room below. Air deflector 58 also directs exhaust air away from cooling air intakes 60 (FIG. 2), preventing the hot air generated by the active equipment from being recirculated into the enclosure 10. The location of air circulation fan assembly 160 is just below the exhaust fan (now shown) of the active equipment (FIG. 5), which helps maximize the exhaust of hot air from enclosure 10.

Figure 13:
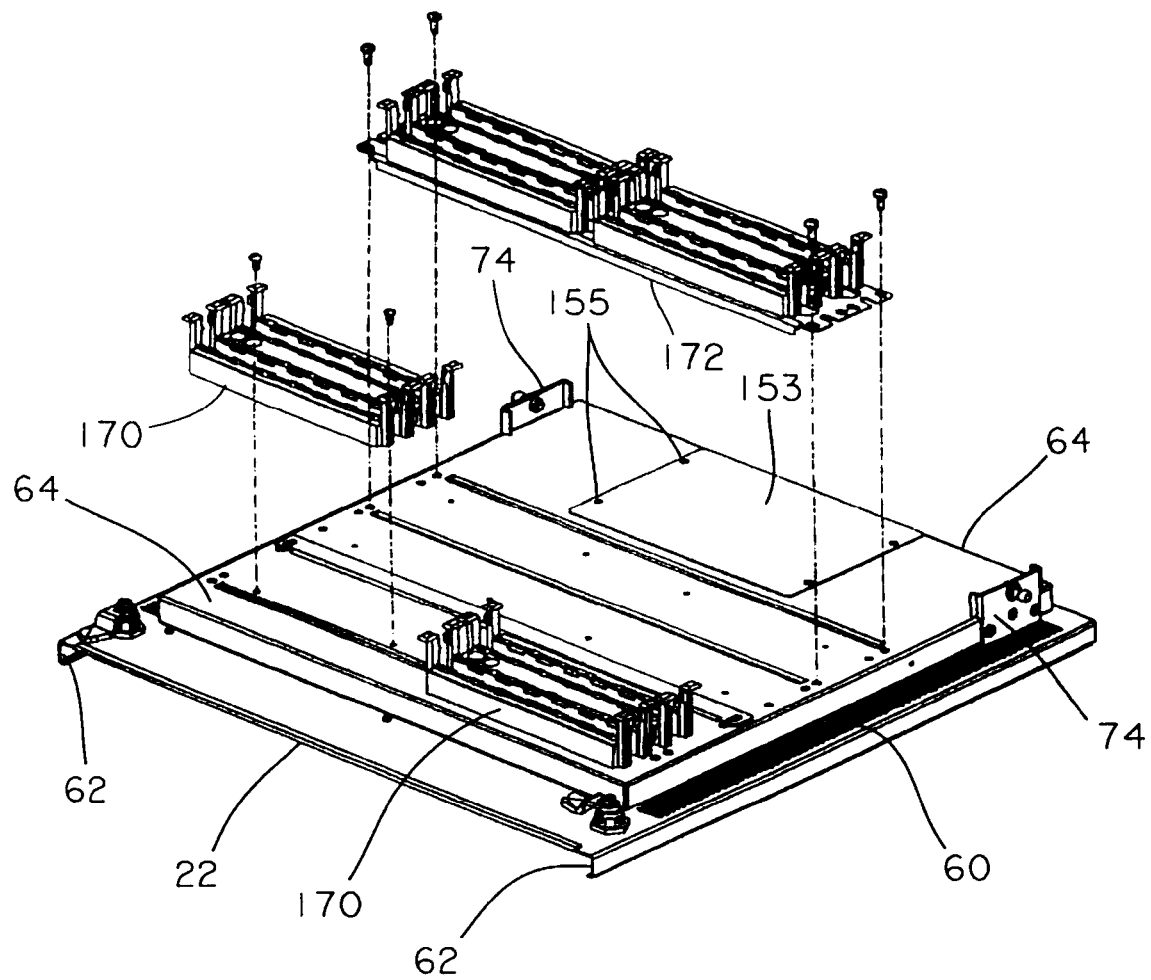
FIG. 13 is a perspective exploded view of the access door of the enclosure of FIGS. 1 and 2, shown with passive equipment punch down blocks inserted into patch panels attached to the inside surface plate of the access door.
Figure 14:
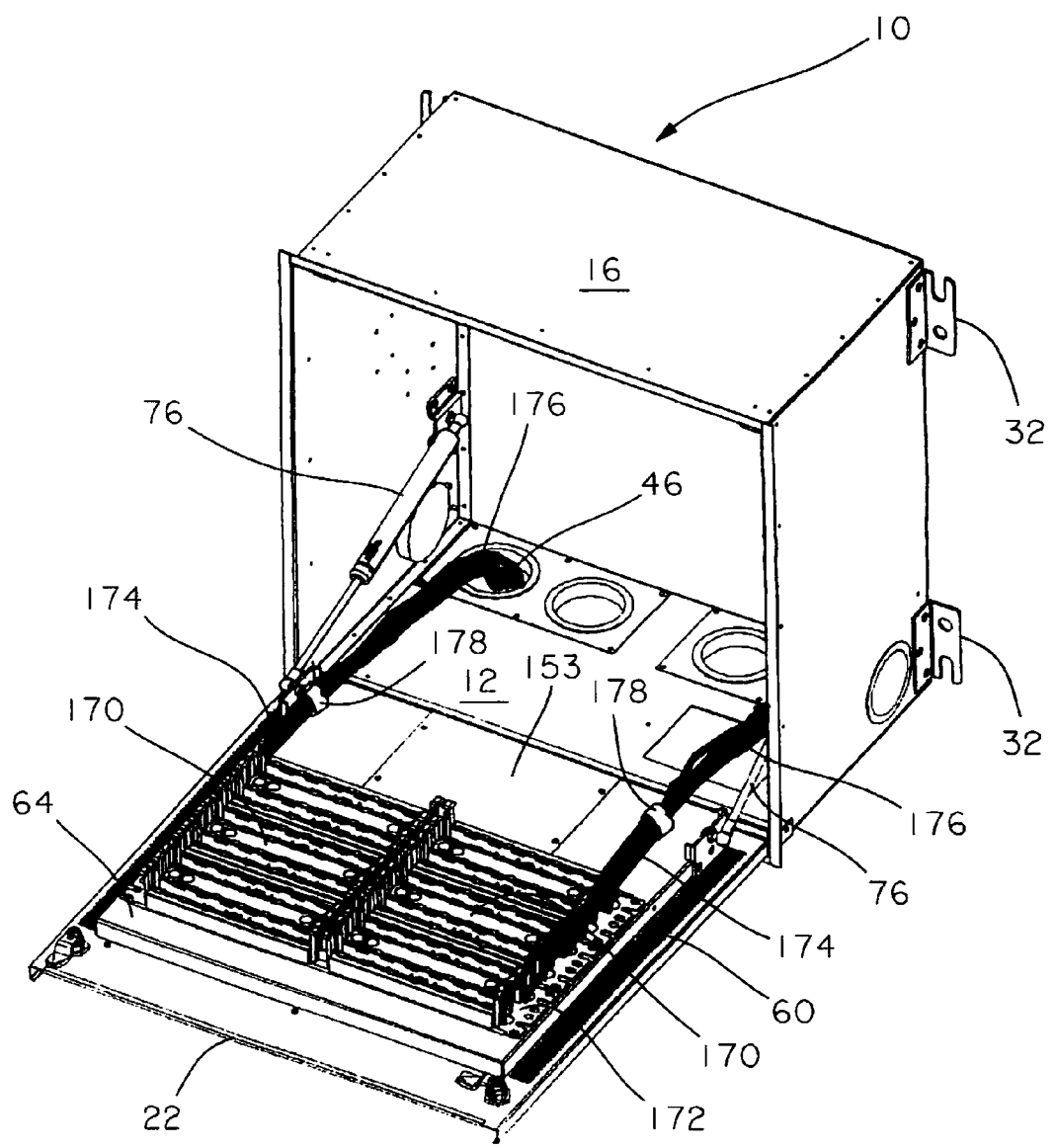
FIG. 14 is a perspective view of the enclosure of the present invention, shown with the access door, as illustrated in FIG. 3, in the open position, and the passive equipment punch down blocks and patch panels of FIG. 13 attached to the inside surface plate of the access door, and the electrical cables entering the enclosure and attached to the patch panels.

FIGS. 13 and 14 are detail and assembly views of an embodiment wherein enclosure 10 is configured to receive passive equipment only, and not active equipment. The equipment mount plate 64 is configured in one embodiment with individual 110 punch down blocks 170 mounted directly to the mount plate 64. In this configuration, equipment mount rails 70, 72 (FIG. 4) are removed, or not installed. Plate 64 is also configured so that, in another embodiment for example, a nineteen inch patch panel 172 that is adapted to receive punch down blocks 170 is mounted directly to plate 64, and punch down blocks 170 are inserted into patch panel 172. This construction allows the end user to bring the punch down blocks 170 or punch down patch panels 172 to a work level when terminating the cables 174. After terminating the cables 174, the entire patch panel 172 can be mounted to mount plate 64. As seen in FIG. 14, bundles 176 of cables 174 extend from punch down blocks 170, or from patch panel 172, through apertures 48 in rear wall 12 to the exterior of enclosure 10. Sufficient slack is provided in cable bundles 176 to allow access door assembly 22 to swing open a full ninety degrees without applying strain on cables 174. Cable bundles 176 are also bound together by a cable strap 178, which strap 178 is attached to an adjacent shear-form 104 (FIG. 4) to prevent migration of cable bundles 176 on horizontal slack management tray 82.

The enclosure 10 is adapted to be converted from a passive to an active network equipment enclosure. As illustrated in FIG. 12, equipment mount plate 64 includes an aperture 152, and access door assembly 22 includes aperture 154. In the active equipment version of enclosure 10 wherein the active network equipment generates heat, exhaust fan assembly 56 is removably installed in apertures 152 and 154 to exhaust hot air generated by the active network equipment in enclosure 10. FIGS. 13 and 14 illustrate the passive version of access door assembly 22 of enclosure 10, wherein aperture 152 is covered by a removable plate 153. In the illustrated embodiment, plate 153 is secured over aperture 152 by means of screws 155; however, other removable fastening means as are known in the art may be substituted for screws 155. If a user desires to convert the embodiment of access door assembly 22 of enclosure 10 from the passive version illustrated in FIGS. 13 and 14 to the active version illustrated in FIGS. 5-12, plate 153 is removed, exposing apertures 152 and 154. Exhaust fan assembly 56 is then installed in apertures 152 and 154 as illustrated in FIGS. 10-12, with exhaust air deflector 58 attached to upper surface 66 (FIG. 3) of access door assembly 22. Power cord 162 is then inserted into a suitable source of electric power to operate air circulator fan assembly 160 (FIG. 10) for exhausting hot air from enclosure 10.

Figure 15:
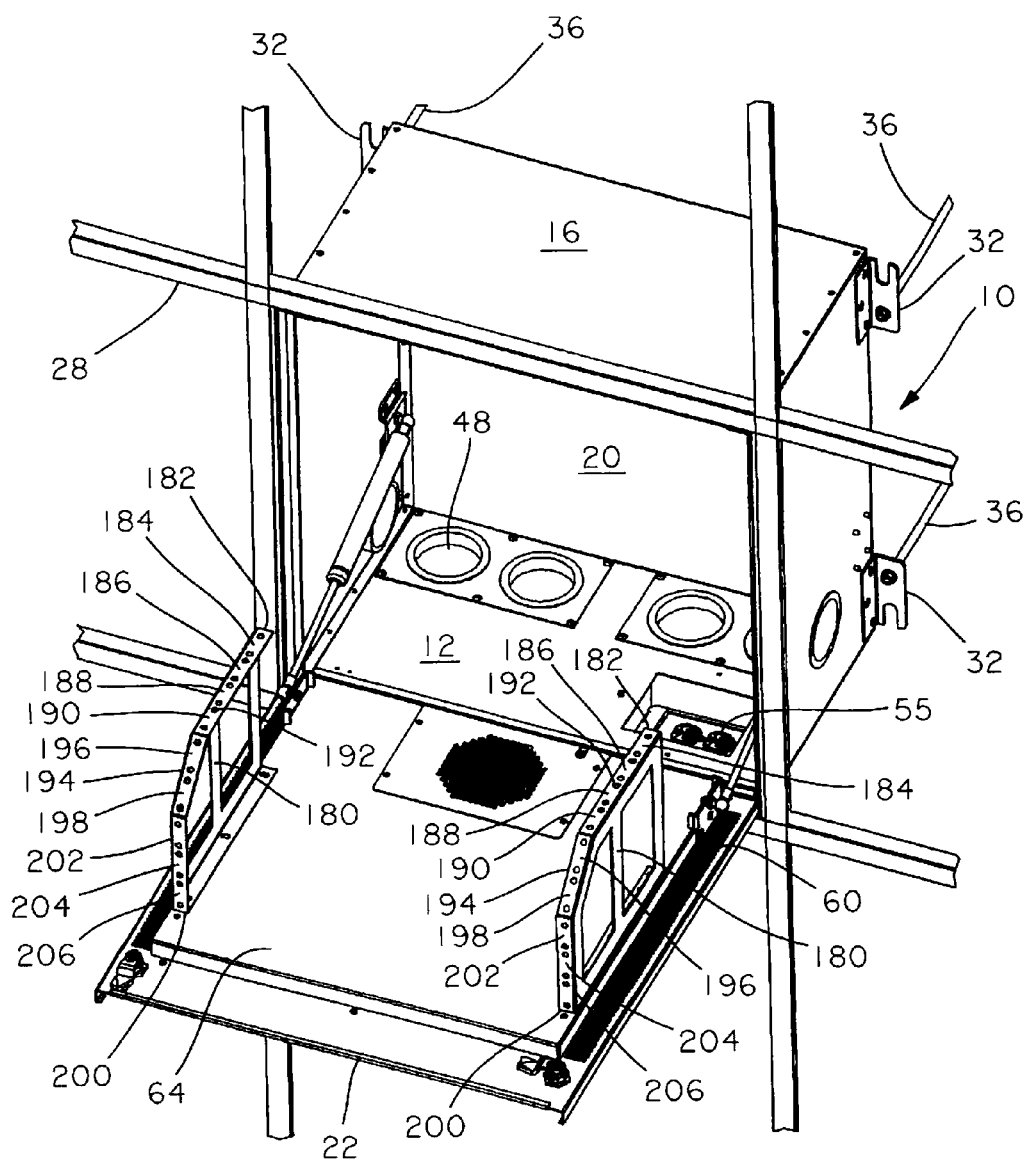
FIG. 15 is a bottom perspective view of the in-ceiling enclosure of FIGS. 1 and 2, shown with the access door open and an alternative embodiment of equipment mounting brackets fastened to the equipment mount plate attached to the interior of the access door.

FIG. 15 illustrates an additional embodiment of the enclosure 10 configured to receive both passive equipment and active equipment. In this embodiment, mounting rails 70, 72 (FIG. 4) are removed, or not installed, and left and right side equipment brackets 180 are fastened directly to equipment mount plate 64. The brackets 180 are of the type sold under the designation CICZBRKT by Panduit Corp., Tinley Park, Ill., or equivalent. The brackets 180 each include an upper rail 182 providing, in the illustrated embodiment, spaces 184, 186, 188 and 190 for the attachment of up to four rack units of passive equipment, such as patch panels (not shown) or the like. The passive equipment is fastened to the upper rails 182 through the apertures 192.

Brackets 180 each also include a slanted rail portion 194 providing spaces 196, 198 for up to two rack units of cable management equipment (not shown). Brackets 180 each also comprise upwardly extending rails 200 providing up to three rack units of space 202, 204, 206 for the mounting of up to three rack units of active equipment (not shown) of up to sixteen and a half inches in depth, in the illustrated embodiment. Upon forward movement and re-attachment of brackets 180 on mounting plate 64, active equipment of greater depth dimensions may be utilized.

FIG. 16 is a detail underside assembly view of a modified reinforced hinge assembly 208 pivotally mounting access door assembly 22 to side walls 14, 18 (FIG. 3) of enclosure 10. As described in conjunction with FIGS. 1 and 2, space 63 extends between ceiling tile brackets 61 and slots 62 on both lateral sides of the underside of access door assembly 22. A U-shaped reinforcing member 210 is inserted in each space 63, on opposite sides of door assembly 22, with U-shaped member 210 abutting slot 62 and ceiling tile bracket 61 simultaneously. Each reinforcing member 210 is attached to access door assembly 22 by fasteners 212 such as nuts and bolts, rivets or the like as are known in the art.

The position of reinforcing member 210 abutting slot 62 includes an aperture 214, and wall 14 includes an aperture 216 axially aligned with aperture 214. A bushing 218 extends through apertures 214 and 216, and an additional reinforcing element 220 having an aperture 222 is attached to the outer surface of wall 14. A mounting pin 224 extends through bushing 218 and through aperture 222 in reinforcing element 220. One end of pin 224 includes a head 226. The opposite end of pin 224 includes a diametrically disposed channel 228 adapted to removably receive cotter pin 230, as is known in the art. With cotter pin 230 installed in channel 228, mounting pin 224 is locked in bushing 218, and access door assembly 22 can rotate smoothly around pin 224 through a ninety degree arc as previously described under the control of gas piston dampers 76. Reinforcing member 210 and additional reinforcing element 220 provide increased strength to the pivotal connection between access door assembly 22 and walls 14 and 18 of enclosure 10, enabling the enclosure 10 to safely hold an amount of active and inactive equipment and cable sufficient to service the work area in the vicinity of enclosure 10.

FIG. 17 is a perspective view of a further use of the enclosure 10 shown in FIGS. 4-9. In the embodiment shown in FIG. 17, various sockets 112 of network switch 108 are electrically connected to designated sockets 126 of patch panel 120 by means of cable bundles 130, as previously explained. Patch panel 120 is attached to forward edges 232 of opposed equipment mount rails 70, 72. Additional patch panel assemblies 234 are attached to rear edge 92 of mount rails 70, 72. In the embodiment illustrated in FIG. 17, bundles of egress cables 148 (FIG. 8) are connected to forward facing sockets 236 of patch panel assemblies 234 at one end, and exit enclosure 10 through aperture 48 as previously explained. Additional cables 238 are connected to rearward facing sockets (not shown) in patch panel assemblies 234, which cables 238 are also attached to active or passive equipment installed in enclosure 10. The embodiment of FIG. 17 illustrates how the equipment mount rails 70, 72 can accommodate additional passive equipment, if necessary, in enclosure 10.

The present invention has been described as an enclosure accommodating active and passive electronic communications equipment, and the cabling leading to and from the enclosure, and the cable residing in the enclosure, to provide increased thermal management for the growing amount of high wattage networking equipment utilized in today's communications systems. The enclosure of the present invention also manages the paths of cable bundles located in the enclosure to provide sufficient cable routing and slack management when the access door assembly of the enclosure is opened/closed, accommodates higher density applications, provides front accessible moves, adds and changes, and contributes to thermal management and improved air flow through the enclosure by maintaining the patch cords away from the active equipment ventilation paths.

The invention claimed is:

1. An in-ceiling cabling enclosure for supporting network equipment and cables interconnecting the network equipment, said enclosure comprising:
a front wall, a rear wall and two side walls;
an access door assembly pivotally attached to one of said rear wall and said two side walls, said access door assembly pivoting through an arc of ninety degrees between an open position and a closed position;
said front wall, said rear wall, said two side walls, and said access door assembly defining a volume in said enclosure;
an equipment mount plate attached to an upper surface of said access door assembly, a space defined between the upper surface of said access door assembly and said equipment mount plate;
said access door assembly including at least one air intake vent providing air access to said volume in said enclosure;
an exhaust fan assembly attached to said access door assembly in said space between said equipment mounting plate and said access door assembly, said space having a depth for receiving the exhaust fan assembly, each of said access door assembly and said equipment mount plate having an aperture, said exhaust fan assembly conveying air from said volume through the apertures located in said access door assembly and said equipment mount plate to an exterior of said enclosure.

2. The in-ceiling cabling enclosure of claim 1, comprising:
an exhaust air deflector mounted on an underside of said access door assembly over one of said apertures in said access door assembly;
said exhaust air deflector directing exhaust air from said enclosure in a direction away from said at least one air intake vent in said access door assembly.

3. The in-ceiling cabling enclosure of claim 1, wherein:
said exhaust fan assembly is located in said access door assembly adjacent an exhaust fan of the network equipment installed in said enclosure.

4. The in-ceiling cabling enclosure of claim 1, wherein:
said apertures located in said access door assembly and said equipment mount plate are aligned.

5. The in-ceiling cabling enclosure of claim 1, wherein:
said exhaust fan assembly is attached within said apertures located in said access door assembly and said equipment mount plate.

6. The in-ceiling cabling enclosure of claim 1, comprising:
a cover plate removably attached over at least one of said apertures located in said access door assembly and said equipment mount plate;
said cover plate adapted to be attached over at least one of said apertures when said enclosure includes only passive network equipment;
said cover plate adapted to be removed from over at least one of said apertures when said enclosure includes one of active and passive network equipment, and active network equipment only.

7. The in-ceiling cabling enclosure of claim 1, comprising:
at least one fan screen plate or fan mount plate, having a screened aperture, covering at least one of said apertures located in said access door assembly and said equipment mount plate.

8. The in-ceiling cabling enclosure of claim 1, comprising:
an air-dam attached to said access door assembly forming a sub volume in said enclosure, said air dam adapted to convey hot air created by active network equipment installed in said sub volume to said exhaust fan assembly to exhaust said hot air to the exterior of said enclosure.

9. The in-ceiling enclosure of claim 1, comprising:
a cable slack management tray attached to said access door assembly creating a sub volume in said enclosure extending between said equipment mount plate and said cable slack management tray.

10. The in-ceiling enclosure of claim 9, wherein:
said cable slack management tray includes shear-forms adapted to secure bundles of cables in said enclosure against movement relative to said cable management tray.

11. The in-ceiling enclosure of claim 9, comprising:
at least one mount rail extending between said equipment mount plate and said cable slack management tray.

* * * * *